(12) United States Patent
Klassen

(10) Patent No.: US 6,353,682 B2
(45) Date of Patent: *Mar. 5, 2002

(54) ROTATED READ-OUT OF JPEG COMPRESSED IMAGES

(75) Inventor: R. Victor Klassen, Webster, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,711

(22) Filed: Sep. 17, 1998

(51) Int. Cl.$^7$ .................................................. G06K 9/36
(52) U.S. Cl. ....................................... 382/233; 382/296
(58) Field of Search ................................ 382/230, 231, 382/232, 233, 234, 235, 236, 237, 296, 297; 348/388, 389, 390

(56) References Cited

U.S. PATENT DOCUMENTS

| 5,751,865 A | * | 5/1998 | Micco et al. ................ 382/296 |
| 5,774,634 A | * | 6/1998 | Honma et al. ............... 395/109 |
| 5,867,598 A | * | 2/1999 | de Queiroz .................. 382/235 |
| 5,903,360 A | * | 5/1999 | Honma et al. .............. 358/450 |
| 5,990,955 A | * | 11/1999 | Koz ............................ 348/390 |

* cited by examiner

Primary Examiner—Phuoc Tran
Assistant Examiner—Amir Alavi
(74) Attorney, Agent, or Firm—Oliff & Berridge, PLC

(57) ABSTRACT

This invention is a method and apparatus for processing compressed digital images. More particularly, this invention relates to methods and apparatus which accomplish rotation in conjunction with a variable-length decompression operation. A small amount of auxiliary information consisting of pointers to the starts of the scanlines is stored along with the DC coefficients in the decompressor, instead of the compressed image, to reduce the memory requirements for orthogonally rotating an image.

24 Claims, 7 Drawing Sheets

ROTATED READ-OUT OF JPEG COMPRESSED IMAGES

BACKGROUND OF THE INVENTION

1. Field of Invention

This invention generally relates to processing compressed digital images. More particularly, this invention relates to methods and apparatus which accomplish rotation in conjunction with variable-length compression/decompression operations.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

The image compression standard disseminated by the Joint Photographic Experts Group (JPEG) committee is a compression technique which reduces data redundancies based on pixel-to-pixel correlations. Generally, a photographic image does not change very much on a pixel-to-pixel basis and therefore has what is known as "natural spatial correlation." In natural scenes, correlation is generalized, but not exact. Noise makes each pixel somewhat different from its neighbors.

SUMMARY OF THE INVENTION

The methods and apparatus of this invention seek to enhance the conventional methods for rotating digital images. In a conventional method for rotating digital images, an image source provides the compressed image data to the system. The image source can be an input device such as a camera or scanner, a transmission channel or a storage device. The compressed image data is input to a decompression unit that reconstructs the image. The uncompressed image is fed into the image rotation unit. The image output is sent to an output image sink, which can be a storage device, a transmission line, or a display device such as a printer or monitor. The disadvantage of this conventional method is that the rotation operations are performed on the decompressed image. Color documents typically contain tens of millions of pixels, such that even simple operations on those image can be computationally and economically expensive and time consuming.

This invention provides a method and apparatus for rotating a compressed digital image as it is decompressed.

This invention separately provides a method and apparatus that generates additional information as the digital image is compressed, where the additional information is used during decompression to rotate the digital image.

This invention separately provides a method and apparatus that generates, as additional information, the DC values of each scanline and pointers to the start position of each initial block of the current scanline.

This invention separately provides a method and apparatus that generate additional information to rotate a digital image that can be stored using a small amount of memory space.

The methods and apparatus of this invention provide an improved image rotation process by reducing its complexity. The methods and apparatus of this invention reduce the computational effort spent in decompressing and rotating a decompressed image. In the methods and apparatus of this invention, rotation is assumed to be an operation which rotates the image by +90° or −90° or may even represent image transposition. The rotation operations can also be combined with image mirroring in the vertical or horizontal direction.

The methods and apparatus of this invention expand on a variable-length compression operation by adding an image rotation operation, where the M×M blocks within the image are orthogonally rotated to rotate the entire image using the compressed image blocks, to avoid the need for buffering the entire image or large sections of it.

More particularly, the methods and apparatus of this invention reduce the memory necessary to orthogonally rotate a digital image in conjunction with a variable-length compression technique, such as Huffman encoding A small amount of auxiliary information, including pointers to the start of the scanlines and the DC coefficients, are stored. A significantly reduced, small-sized block of working memory can be used to save this information. In particular, the space required to store this additional information is proportional to the square root of the space required by the compressed image.

One aspect of this invention deals with a basic problem in digital image processing systems regarding the memory-intensive and computationally-intensive image rotation operation. This aspect is further based on the discovery of a technique that alleviates this problem. This technique associates the rotation of a small image segment or block with decompressing that small image segment or block, and managing the rotated-decompressed blocks to enable rotation using minimal buffer memory.

By avoiding the very expensive process of rotating the decompressed image, the method and apparatus of this invention reduces the computation necessary to rotate a digital image. Using the method and apparatus of this invention, the rotated image has excellent quality without requiring a full buffer's worth of memory.

The method and apparatus of this invention can be implemented, for example, by modifying basic JPEG compression and decompression methods, where image rotation is performed on the compressed image data (compressed units). Accordingly, the method and apparatus of this invention can be applied to any number of devices, including digital printers and copiers, that need to provide a rotated image. The apparatus according to this invention includes data or image processing systems capable of compressing images.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
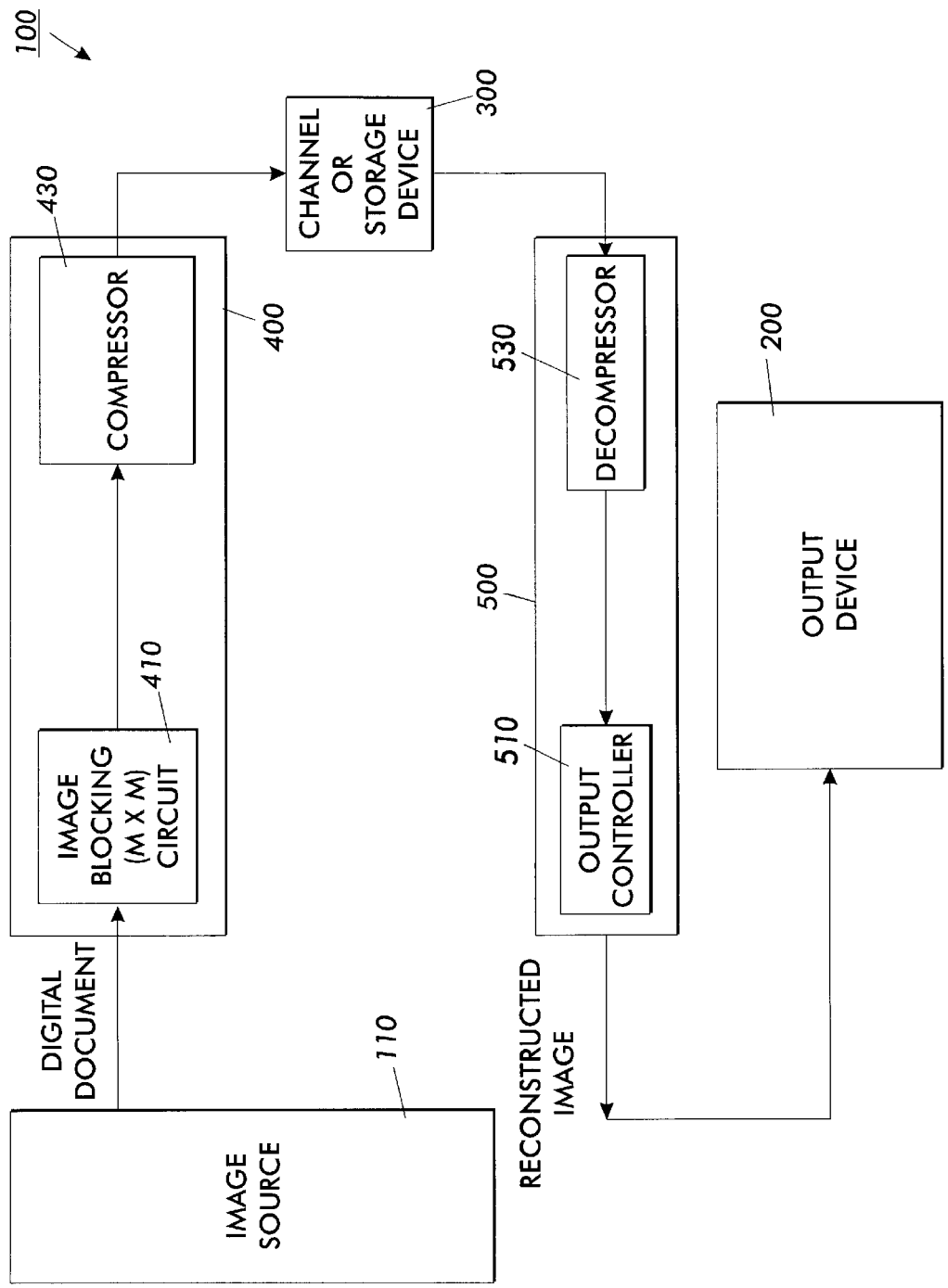
FIG. 1 is a generalized functional block diagram of a compression and decompression system according to this invention.

FIG. 1 shows a generalized functional block diagram of a compression and decompression system 100 according to this invention. The compression and decompression system 100 includes an image source 110 that may be any one of a number of different sources, such as a scanner, a digital copier or a facsimile device suitable for generating electronic image data, or a device suitable for storing and/or transmitting the electronic image data, such as a client or a server of a network. The electronic image data from the image source 110 is provided to an encoder 400 of the compression and decompression system 100.

In particular, the encoder 400 includes an image blocking portion 410 that divides the electronic image data into a plurality of M×M block or segments. In one embodiment, the blocking operation may be accomplished by windowing or cropping that enables the transfer of data comprising one or more M×M blocks of data from the input document to a block memory to be stored in the encoder 400. Once stored, the data is input by a compressor 430. In the compressor 430, the M×M blocks of image data are compressed to form a compressed image. Preferably, the compressor 430 compresses the image using various compression operations associated with the JPEG compression standard to compress the image data within a block, although any known or later developed compression technique that compresses the image on a block-by-block basis is equally usable. In the compressor 430, the data may be operated on in any of a number of well-known bit- or byte-wise operations to accomplish the compression of the image data, wherein additional information are generated as the image is compressed.

Once compressed, the compressed image data then is preferably transferred to the channel or storage device 300. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the encoder 400 according to this invention to a physically remote decoder 500 according to this invention. Thus, the channel device can be a public switched telephone network, a local or wide area network, an intranet, the Internet, a wireless transmission channel, any other distributed network, or the like.

Similarly, the storage device can be any known structure or apparatus for indefinitely storing compressed image data, such as a RAM, a hard drive and disk, a floppy drive and disk, an optical drive and disk, flash memory or the like. Moreover, the storage device can be physically remote from the encoder 400 and/or the decoder 500, and reachable over the channel device described above.

The compressed image data is then preferably processed by the decoder 500, where rotation using the additional information or the like is accomplished. In particular, the decoder 500 includes a decompressor 530 that receives compressed image data from the channel or storage device 300 and an output controller 510 that pastes the blocks of decompressed image data from the decompressor 530 in their corresponding position. Though the decoder 500 is shown in FIG. 1 as physically separate from the encoder 400, it should be understood that the decoder 500 and the encoder 400 may be different aspects of a single physical device.

The output controller 510 sends the reconstructed image to the output device 200. It should be understood that the output device 200 can be any device that is capable of processing the decompressed image data generated according to the invention, for example, a rotated image. For example, the output device 200 can be a printer, such as a laser printer, an ink jet printer, a thermal printer, a dot matrix printer, a digital photocopier or the like, a display device, such as a CRT, flat panel LCD or LED display, or the like. Moreover, the decompressor 500 can be physically incorporated into the printer or the display device.

Figure 2:
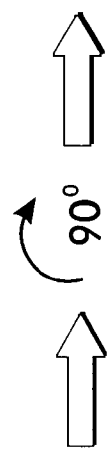
FIG. 2 depicts the segmentation of an exemplary image into blocks for compression as applied in the compression and decompression system of FIG. 1.

FIG. 2 depicts the segmentation of an exemplary image into blocks for compression, preferably in accordance with the JPEG standard, and subsequent rotation. Blocks $A_1$–$A_N$ represent the top-most blocks of scanlines or rasters of data in the input image, while blocks $A_1$–$Z_1$ represent the left-most blocks of scanlines in the image. Each block is an M×M segment of the image. In a rotated image, each block is intra-block rotated and the relative position of each block within the image is also inter-block rotated to completely rotate the image, so that blocks $Z_1'$–$A_1'$ are the top-most blocks and $Z_1'$–$Z_N'$ are the left-most blocks in a +90° rotated image. It should be appreciated that the intra-block rotation of a single M×M block can be accomplished in a rapid fashion using an equivalently-sized memory region so that the value associated with any pixel position is simply copied or moved to the corresponding rotated position. On the other hand, a more processing intensive approach may be to simply use a single register to temporarily store the data associated with only a single pixel position and to move successive pixels through that single register to rotate the pixels of that block.

Figure 3:
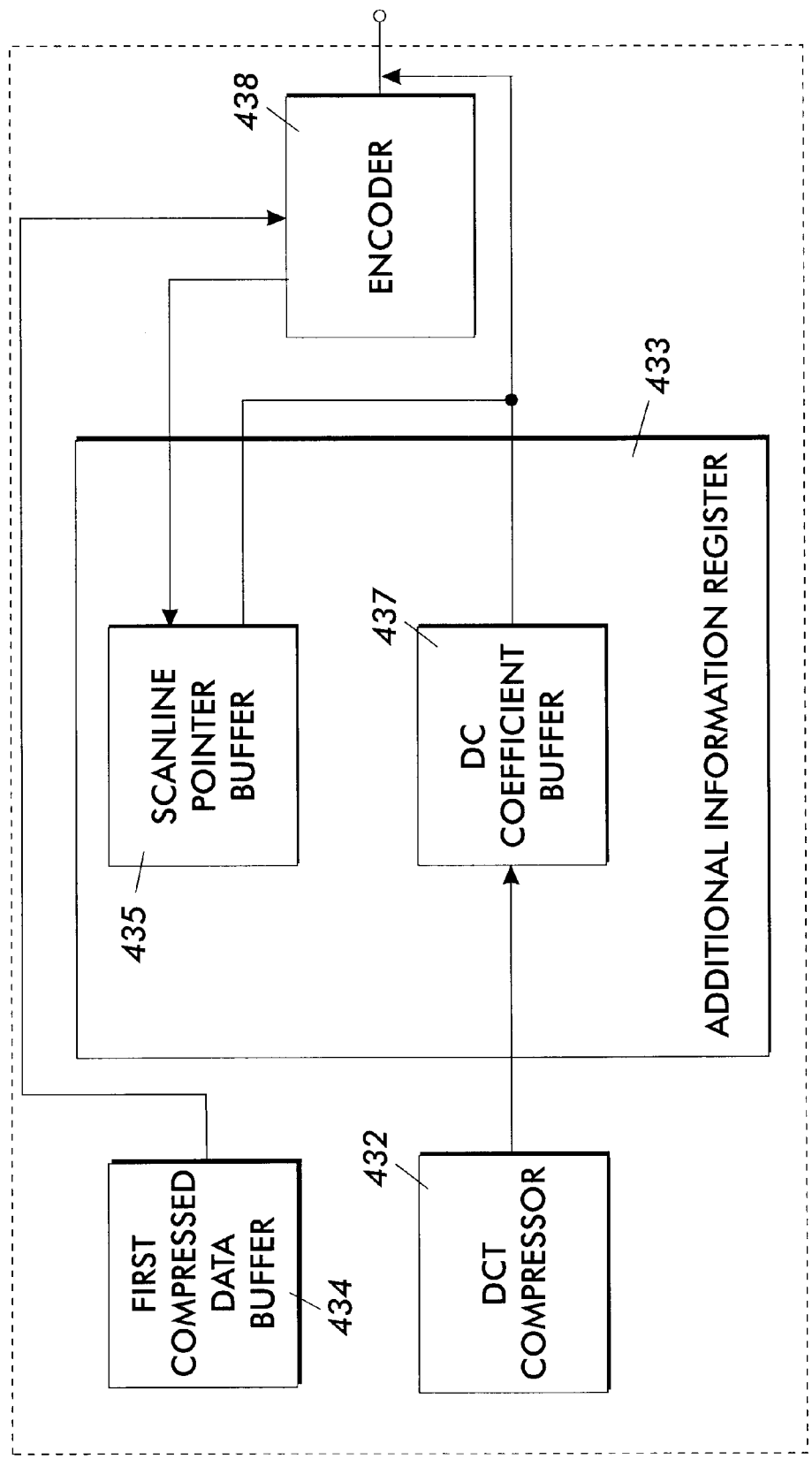
FIG. 3 shows a generalized functional block diagram of a compressor according to this invention.

FIG. 3 shows a generalized functional block diagram of the compressor 430, when implementing the JPEG compression standard. It will be apparent to those of ordinary skill in the art, from the following description of the compressor 430, how to modify the compressor 430 to implement other compression techniques to generate the additional information according to this invention. Thus, because such modifications are readily apparent and predictable from the following discussion of the JPEG and Huffman implementation of the compressor 430, additional descriptions of other compression techniques' implementations are not necessary and are thus omitted.

In the compressor 430, a DCT compressor 432 inputs the M×M blocks of image data and outputs compressed data. A first compressed data buffer 434 inputs and stores the compressed data. The DCT compressor 432 also outputs additional information related to the implemented JPEG compression technique. Thus, for JPEG compressed data, the additional information is the DC coefficients of the blocks. An additional information register 433 inputs and stores the additional data. Because the compressor 430 uses the JPEG standard to compress the image data, the additional information register 433 includes a DC coefficient buffer 437. The compressed image data from the first compressed data buffer 434 is then input to an encoder 438 to further compress this data. However, it should be appreciated that this additional compression is optional.

In a preferred embodiment of the compressor 430, additional encoding, such as Huffman encoding, is performed. In such instances, additional information, for example, scanline pointers, are output from the encoder 438. The additional information register 433 inputs and stores the scanline pointers. Thus, the additional information register also includes a scanline pointer buffer 435.

It should be appreciated that though the encoding method of the encoder 438 discussed above is Huffman encoding, any other variable length encoding method, or any other second level encoding method, which does not use image blocking, can be used. In such instances, such as run-length encoding, the image is compressed without blocking the image prior to compression.

In the preferred embodiment of the compressor 430 described above, the image data is compressed using the JPEG standard with subsequent Huffman encoding. It should be appreciated that in instances in which the additional encoding, such as Huffman encoding, is not performed, the scanline pointer buffer 435 and the encoder 438 are not needed. It will also be understood by those skilled in the art that the particular components of the additional information register 433 will depend on the particular compression technique or techniques used to compress the M×M blocks.

For the system described above that implements JPEG block compression, the DC coefficient of only the left-most block of the set of scanlines forming the blocks, assuming left-to-right analysis of the blocks, is needed as the additional information sufficient to decompress and rotate the compressed image data. This is because the JPEG decompression process of each block will inherently generate the value of the DC coefficient for the next block in the current scanline of the unrotated image. Similarly, only the start position or address of the left-most block is needed as additional information sufficient to decompress the Huffman encoded compressed image data. This is because the Huffman decompression process of each block will inherently generate the start position or address of the next block in the current scanline of the unrotated image.

Upon decompression, a rotated readout processor reads the scanline pointers from a scanline pointer buffer and the DC coefficients from a DC coefficient buffer, and processes compressed data based on the read scanline pointers and DC coefficients. Accordingly, a significantly smaller block of working memory is used instead to store the scanline pointers and the DC coefficients obtained from the compressor 430.

Figure 4:
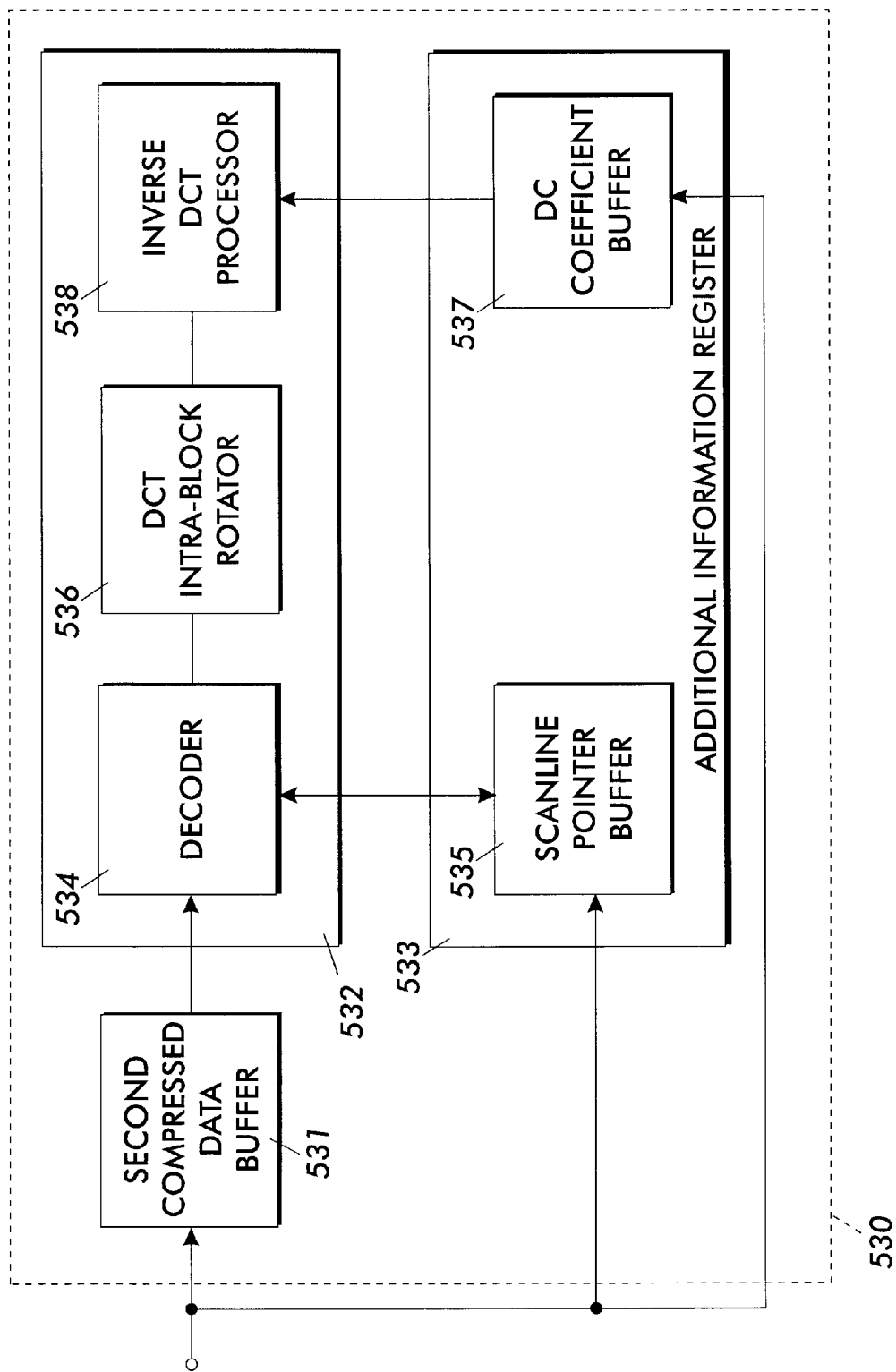
FIG. 4 shows a generalized functional block diagram of a decompressor according to this invention.

FIG. 4 shows a generalize functional block diagram of the decompressor 530, which decompresses image blocks compressed using Huffman encoding and the JPEG compression standard. It will be apparent to those of ordinary skill in the art, how to modify the decompressor 530 from the following description of the decompressor 530 to implement other decompression techniques to use the additional information generated according to this invention. Thus, because such modifications are readily apparent and predictable from the following discussion of the JPEG and Huffman implementation of the decompressor 530, additional descriptions of other compression techniques' implementations are not necessary and are thus omitted.

The compressor 530 includes a rotated read out processor 532, a second compressed data buffer 531 and an additional information register 533. The rotated read out processor includes a decoder 534, a DCT intra-block rotator 536 and an inverse DCT processor 538. Because the decompressor 530 is using the JPEG standard and Huffman decoding to decompress the image data, the additional information included with the compressed image data includes the JPEG DC coefficients and the scanline pointers of selected ones of the compressed blocks of image data. Thus, the additional information register 533 includes a scanline pointer buffer 535 and a DCT coefficient buffer 537.

In operation, the decompressor 530 separates the additional information from the compressed image data and stores the additional information in the additional information register 533 and the compressed image data in the second compressed data buffer 531. It will be understood by those skilled in the art that the particular additional information supplied with the compressed image data will depend upon the particular compression techniques used to compress the M×M blocks. Thus, the particular components of the additional information register 533 will depend on those particular compression techniques.

In the preferred embodiment of the compressor 430 described above, the image data is compressed using the JPEG standard with subsequent Huffman encoding. Accordingly, the additional information supplied with the compressed image data includes scanline pointer data and DC coefficient data. Accordingly, the additional information register 533 includes the scanline pointer buffer 535 and the DC coefficient buffer 537. In particular, the scanline pointer data is stored in the scanline pointer buffer 535 while the DC coefficient data is stored in the DC coefficient buffer 537. As each compressed and encoded block is output by the second compressed data buffer 531 to the rotated read out processor 532, the appropriate scanline pointer data and DC coefficient data for that particular block are output by the scanline pointer buffer 535 and the DC coefficient buffer 537 to the rotated reader processor 532.

In particular, the scanline pointer data is output by the scanline pointer buffer 535 to the decoder 534 while the DC coefficient data for that block is provided to the inverse DCT processor 538 from the DC coefficient register buffer 537. The decoder 534 uses the scanline pointer data to extract the appropriate Huffman encoded data for that block and decodes that Huffman encoded block to form a decoded block. The decoded block is then output by the decoder 534 to the DCT intra-block rotator 536. The DCT intra-block rotator 536 intra-block rotates the compressed image data, as set forth in copending U.S. patent application Ser. No. 08/721,130, herein incorporated by reference in its entirety. The intra-block rotated block is then output by the DCT intra-block rotator 536 to the inverse DCT processor 538.

The inverse DCT processor 538 inverse DCT transforms the current block to decompress it using the DC coefficient for the current block supplied by the DCT coefficient buffer 537. The inverse DCT processor 538 then outputs the decompressed intra-block rotated block to the output controller 510, where it is placed into the image at the appropriate inter-block rotated location.

It should be appreciated that in instances in which Huffman encoding is not performed, the decoder 534 and the scanline pointer buffer 535 are not needed.

In operation, the +90° rotated image is formed left-to-right and top-to-bottom. Thus, the compressed and Huffman encoded blocks of image data are decoded and then decompressed and simultaneously rotated by selecting the compressed and encoded data corresponding to the $Z_1$ through $A_1$ blocks to form the top scanline of the +90° rotated image. The next scanline is formed by selecting the compressed and encoded data corresponding to the $Z_2$ through $A_2$ blocks, and so on.

Thus, for each of the $Z_1$ through $A_1$ blocks, the decoder 534 inputs the scanline pointers for the $Z^{th}$ through $A^{th}$ blocks in order from the scanline pointer buffer 535. Based on each of the $Z^{th}$ through $A^{th}$ scanline pointers read from the scanline pointer buffer 535, the decoder 534 selects the set of encoded data that it will decode to form each of the $Z_1$ through $A_1$ blocks of compressed image data. This also identifies the start position or address of each of the sets of encoded data that will decode to form each of the $Z_2$ through $A_2$ blocks of compressed image data. These $Z_2$–$A_2$ new start positions or addresses are then re-stored in the scanline pointer buffer 535 as the $Z^{th}$-$A^{th}$ scanline pointers, respectively, and will be used to point to the start positions or addresses to be used when decoding the rotated second scanline data.

Similarly, for each of the $Z_1$ through $A_1$ blocks of compressed image data, the inverse DCT processor 538 inputs, in order, the DC coefficient for the $Z^{th}$ through $A^{th}$ blocks from the DC coefficient buffer 537. The inverse DCT processor 538, based on each of the $Z^{th}$ through $A^{th}$ DC coefficients read from the DC coefficient buffer 537, inverse DCTs, or decompresses, the intra-block rotated $Z_1$ through $A_1$ blocks of image data, respectively. This also generates the DC coefficient values needed to decompress the $Z_2$ through $A_2$ blocks of image data, respectively. The $Z^{th}$ through $A^{th}$ new DC coefficient values are then re-stored in the DC coefficient buffer 537 as the $Z^{th}$ through $A^{th}$ DC coefficients, respectively, and will be used to decompress the rotated second scanline of compressed image data.

Figure 5:
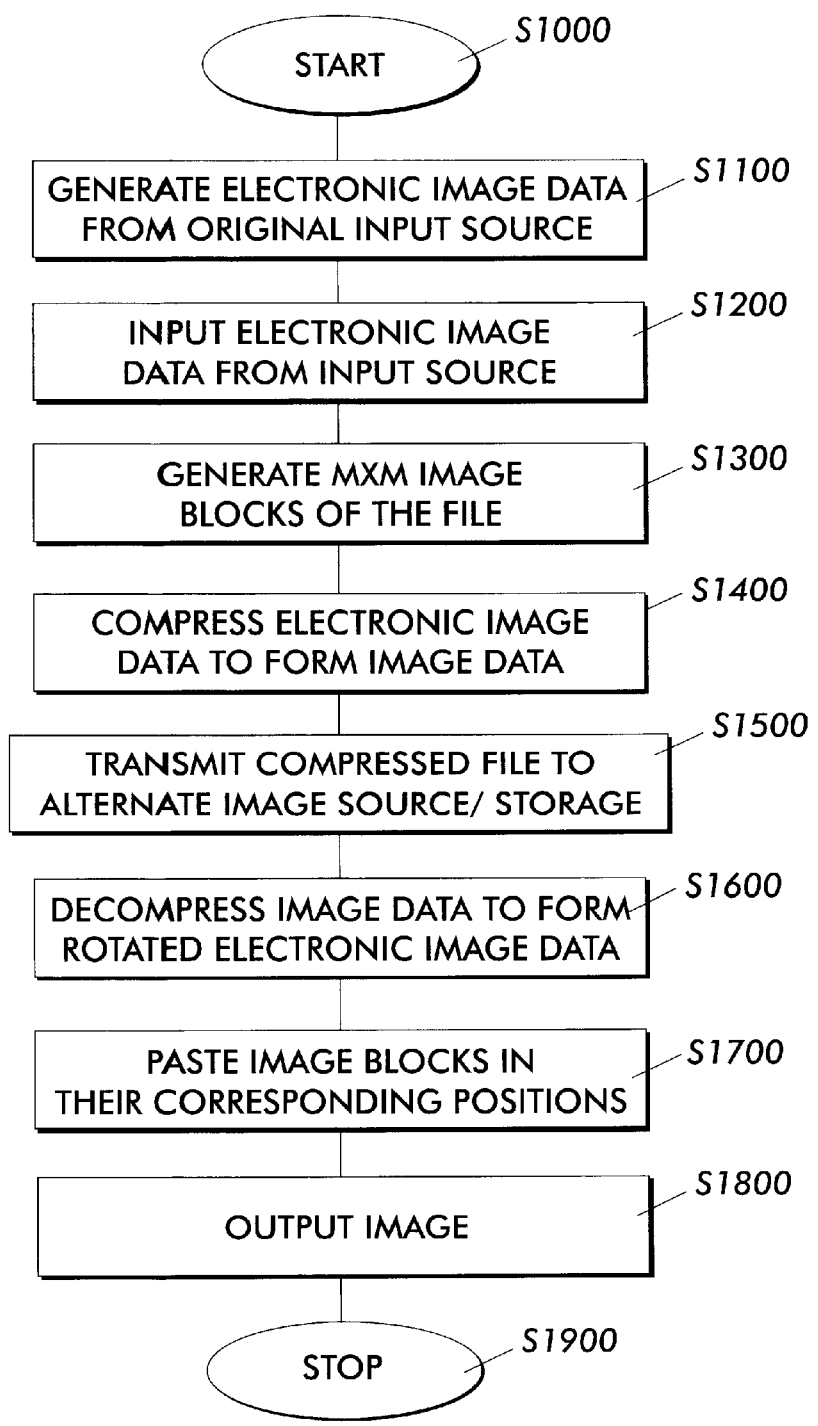
FIG. 5 is a flowchart outlining an image compression and decompression method in accordance with this invention.

FIG. 5 is a flowchart outlining one embodiment of an image compression and decompression method in accordance with this invention. Beginning in step S1000, control continues to step S1100, where electronic image data is generated from an original image. Then, in step S1200, the electronic image data is input from the image source.

It should be appreciated that, while the flowchart of FIG. 5 shows generating the electronic image data as part of the process, this step is not necessarily needed. That is, while the electronic image data can be generated by scanning an original image, or the like, the electronic image data could have been generated at any time in the past. Moreover, the electronic image data need not have been generated from an original physical image, but could have been created from scratch electronically. Accordingly, if the electronic image data is already available to the image source, step S1100 can be skipped, with control continuing directly from step S1000 to step S1200.

In step S1300, the M×M image blocks are generated from the electronic image data. Then, in step S1400, the compressed image data and the additional information are generated from the M×M image blocks. Next, in step S1500, the compressed image data and the additional information are transmitted to an alternate image source or to storage.

It should also be appreciated that the compressed image data could have been previously stored and/or previously transmitted to the location where the compressed image data is to be decompressed, and that steps S1100–S1500 can be omitted from the process. That is, the decompression method according to this invention is unconcerned with how and/or when the original image was converted into electronic image data, and how and/or when the electronic image data was generated, converted to compressed image data, and/or transmitted to and/or stored at the location where the compressed image data is to be decompressed. Accordingly, if the compressed image data is already available, steps S1100–S1500 can be skipped, with control continuing directly from step S1000 to step S1600.

In step S1600, the compressed image data is decompressed and rotated using the additional information. Subsequently, in step S1700, the rotated blocks are pasted into their corresponding inter-block rotated positions. Next, in step S1800, the image data is output. Then, in step S1900 the control routine ends.

According to the method and apparatus of this invention, rotation of the compressed image data occurs in the decompressor at step S1600. This rotation step can be done by intra-block rotating each image block separately, and pasting the consecutive image blocks in their respective inter-block rotated positions.

Figure 6:
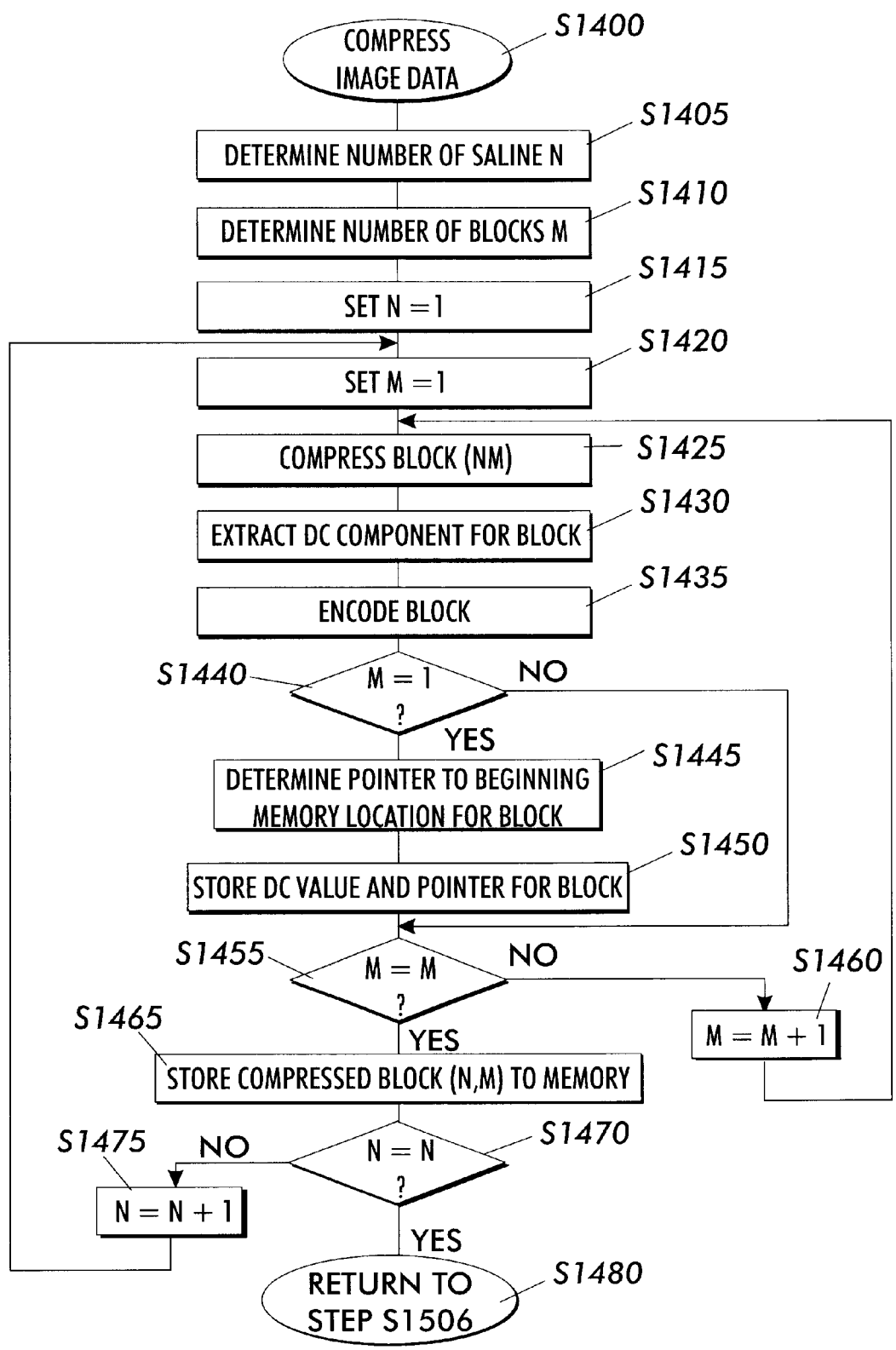
FIG. 6 is a flowchart outlining in greater detail the compression step of FIG. 5.

FIG. 6 outlines in greater detail the compression process of step S1400. Beginning in step S1400, control continues to step S1405, where the control routine determines the number of block scanlines N in the image. Then, in step S1410, the number of blocks M in each block scanline is determined.

In step S1415, the scanline counter n is set to 1. Then, in step S1420, the block counter m is set to 1. Control then continues to step S1425.

In step S1425, the block (n,m) is compressed. In step S1430, the DC component is extracted. In step S1435, block (n,m) is encoded. Control then continues to step S1440.

In step S1440, the control routine determines if m equals 1. If so, control continues to step S1445. Otherwise, control jumps to step S1455.

In step S1445, the control routine determines a pointer to the beginning memory location for the scanline based on the stored block. Then, in step S1450, the DC coefficient and the pointer for the stored block are stored.

In step S1455, the control routine determines if m equals M. If not, control continues to step S1460. Otherwise, if the last block M has been compressed and encoded, control jumps to step S1465.

In step S1460, m is incremented by one. Control then returns to step S1425.

In step S1465, the compressed block (n,m) is stored to memory. In step S1470, the control routine determines if n equals N. If not, control continues to step S1475. Otherwise, if the last scanline is reached, control jumps to step S1480.

In step S1475, n is incremented by one. Control then returns to step S1420.

In step S1480, the control routine returns to step S1500.

Figure 7:
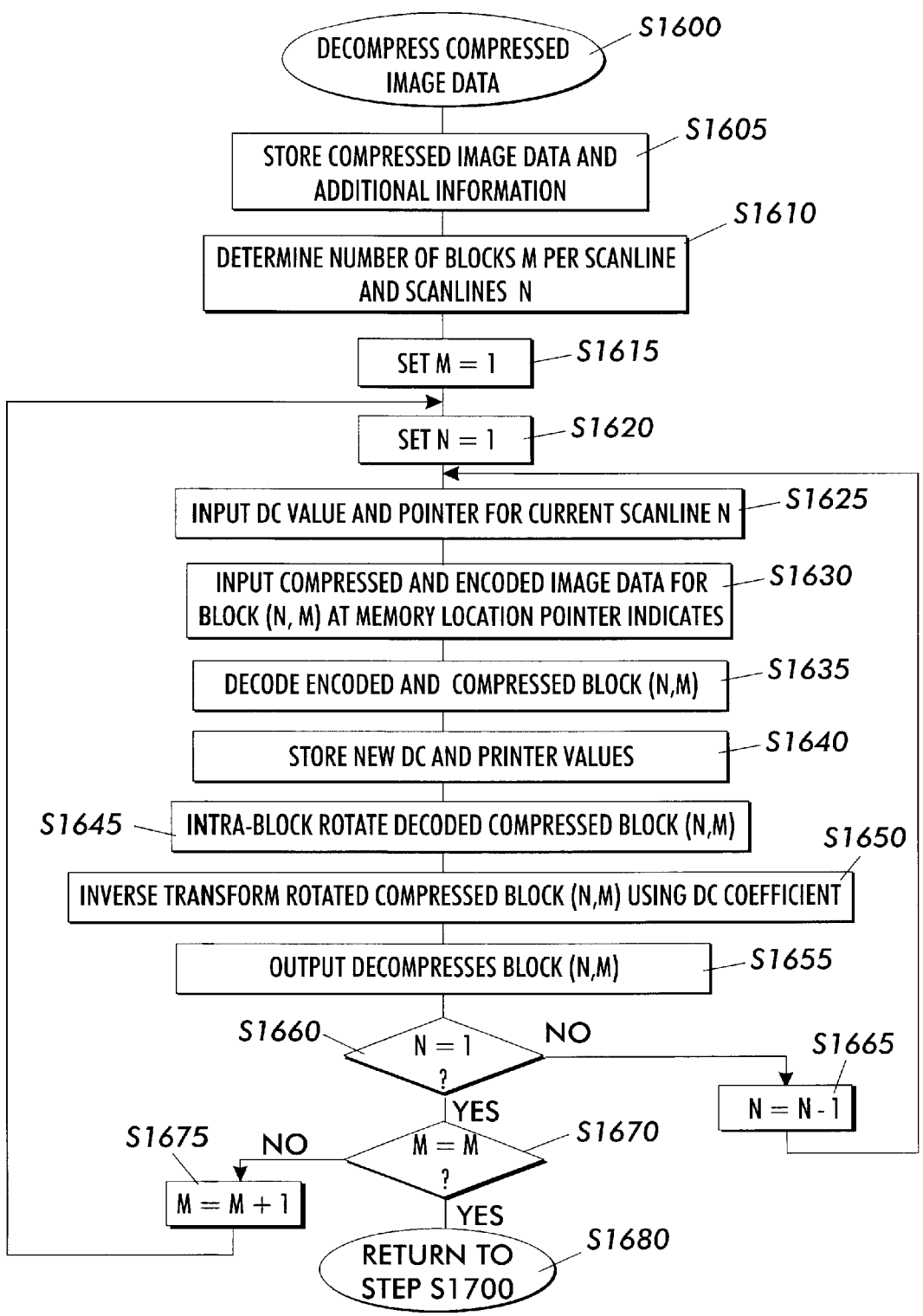
FIG. 7 is a flow chart outlining in greater detail the decompression and rotation step of FIG. 5.

FIG. 7 outlines in greater detail the decompression process of step S1600. Beginning in step S1600, control continues to step S1605, where the compressed image data and additional information are input and stored to memory. Then, in step S1610, the number of blocks M in each block scanline and the number of block scanlines N in the image are determined.

In step S1615, the block counter m is set to 1. Then, in step S1620, the scanline counter n is set to N. Control then continues to step S1625.

In step S1625, the DC coefficient and the pointer for the scanline n are input from memory. Then, in step S1630, the compressed and encoded image data for block (n,m) at the memory location indicated by the pointer is input. Control then continues to step S1635.

In step S1635, the encoded and compressed block (n,m), is decoded to obtain the compressed image data for the block (n,m) and thus the new DC coefficient and scanline pointer for the current scanline n. Then, in step S1640, the new DC coefficient and the new scanline pointer for the current scanline n are stored in the memory in place of the present DC coefficient and scanline pointer for the current scanline n. Next, in step S1645, the decoded compressed block (n,m) is intra-block rotated. Control then continues to step S1650.

In step S1650, the rotated compressed block (n,m) is inverse transformed using the input DC coefficient. Then in step S1655, the decompressed block (n,m) is output. Control then continues to step S1660.

In step S1660, the control routine determines if n equals 1. If not, control continues to step S1665. Otherwise, control jumps to step S1670.

In step S1665, n is decremented by one. Control then returns to step S1625.

In step S1670, the control routine determines if m equals M. If not, control continues to step S1675. Otherwise, the last block M of each of the scanlines has been decoded and decompressed and control jumps to step S1680.

In step S1675, m is incremented by one. Control then returns to step S1620.

In step S1680, the control routine returns to step S1700.

According to the methods and apparatus of this invention, when implementing the JPEG compression/decompression standard, the DC coefficient employed is based upon the current block or an initial condition. For a +90° clockwise rotation, each block $Z_1$–$A_1$ is treated as the first block in a sequence of blocks, and the DC coefficients for each block $A_1$–$Z_1$ are stored in the DC coefficient buffer 437 so that the DC coefficients will be available during the processing of blocks that will immediately follow each of the $Z_1$–$A_1$ blocks in the rotated image. Accordingly, the output of the variable length encoding operation stores the DC coefficients in the DC coefficient buffer 37 so that they are available when needed as an initial condition. Also, the scanline pointers for the first blocks $A_1$–$Z_1$, of the scanline are stored in scanline pointer buffer 435. It will be appreciated that the size of the buffers 435, 437, 535 and 537 are dependent upon the size, or more particularly the length, of the initial image, requiring memory of sufficient size to store offsets of each block $A_1$–$Z_1$.

In the decompression process, using InScan as the index value of the current scanline of blocks, ranging from 1 to N, and InBlock as the index value of the current block, ranging from 1 to M, the following steps are followed:
1. For InBlock=1 to M
2. For InScan=N downto 1 by 1
3. DC=DCVals[InScan]
4. PTr=ScanPtrs[InScan]
5. Huffman decode( )
6. Intra-block Rotate( )
7. Decompress( )
8. DCVals[InScan]=DC
9. ScanPtrs[InScan]=Ptr If another rotated copy is to be made, the values of DCVals and ScanPtrs may be recovered as:
For InScan=1 to N-1 by 1
DCVals[InScan+1]=DCVals[InScan]
ScanPtrs[InScan+1]=ScanPtrs[InScan]
DCVals[1]=128
ScanPtrs[1]=(address of start of image).

For 8-bit image data, a value of "128" is the assumed value of the DC term of the block before the first block of the first scanline.

For a tiny image of 12 blocks, wherein M=3 and N=4, the blocks 1 through 12 are numbered as:

| 1 | 2 | 3 |
|---|---|---|
| 4 | 5 | 6 |
| 7 | 8 | 9 |
| 10 | 11 | 12 |

There are 4 scan pointers and 4 DC values initialized for the scanlines. The pointers and DC values are initialized as if the decompressor were about to decode blocks 1, 4, 7 and 10. For each block, the DC term for that block and the memory address of that block are, for example:

| 128 | 0 | 50 | 10 | 45 | 18 |
|---|---|---|---|---|---|
| 33 | 27 | 67 | 38 | 78 | 47 |
| 35 | 56 | 35 | 63 | 35 | 69 |
| 40 | 68 | 41 | 79 | 43 | 96 |

First, the following values are assigned or obtained from memory: InBlock=1, which is less than N (3); InScan=4, which is greater than 1; DC=40; and PTr=68. That is in steps 1–4, m is set to 1, n is set to 4, the value of the DC coefficient read from memory for the fourth scanline is 40 and the value for the scanline pointer for the fourth scanline is 68.

Then, block 10 of the encoded compressed image data is read from memory beginning at the memory location 68. Then, decoding, such as Huffman decoding, is performed in step 5. This effectively sets the value of the DC coefficient (DC) to 41 and the value of the scanline pointer (PTr) to 79 for the next block, block 11, in the fourth scanline. Then, block 10 is intra-block rotated in the transformed domain and decompressed in steps 6 and 7. Then, DCVals[4] is set to 41 in step 8 and ScanPtrs[4] is set to 79 in step 9 and stored in memory as the DC coefficient and the scanline pointer for the fourth scanline to enable decoding and decompressing block 11.

Then, in step 2, for InScan=3, which is greater than 1, the following values are obtained from memory for the third scanline: DC=35 and PTr=56 in steps 3 and 4.

Next, block 7 of the compressed image is read from the memory beginning at the memory location 56 and Huffman decoded in step 5. This effectively sets the value of the DC coefficient (DC) to 35 and the value of the scanline pointer (PTr) to 63 for the next block, block 8, in the third scanline. Then, block 7 is intra-block rotated and decompressed in steps 6 and 7 as before. Then, DCVals[3] is set to 35 in step 8 and ScanPtrs[3] is set to 63 in step 9 and stored in memory as the DC coefficient and the scanline pointer for the third scanline to enable decoding and decompressing block 8.

The process continues in like fashion, Huffman decoding blocks 4 and then 1 in step 5, which are read from the memory beginning at memory locations 27 and 0, respectively, rotating blocks 4 and 1 in step 6 and decompressing blocks 4 and 1 in step 7, as above. At this point InScan reaches 0. In response, the value of InBlock is increased by 1 to 2 in step 1, and the entire process of steps 2–9 is repeated for blocks 11, 8, 5 and 2. This process of steps 1–9 is repeated a third time for blocks 12, 9, 6 and 3, after which InBlock reaches the value 3.

In this fashion, intra-block rotated versions of blocks 10, 7, 4 and 1 are formed first and pasted into the appropriate inter-block rotated position in the output image. This is then followed by forming and inter-block pasting the intra-block rotated versions of blocks 11, 8, 5 and 2, and so forth, giving a rotated final version of the image as:

| 10R | 7R | 4R | 1R |
|---|---|---|---|
| 11R | 8R | 5R | 2R |
| 12R | 9R | 6R | 3R |

It should be appreciated that, although the method and apparatus described above provides for a clockwise rotation, counterclockwise rotations may be obtained. For a counterclockwise rotation, readout is from top-to-bottom, but from right to left. That is, in step 2, InScan increases from 1 to N while in step 1, InBlock decreases from M to 1. However, right to left decoding of Huffman encoded data is not possible. Thus, direct counterclockwise rotations can only be used without subsequent variable length encoders. Thus, steps 4, 5 and 9 will be omitted.

Thus, for a counterclockwise rotation of data of −90° (or a clockwise rotation of data of +270°) where Huffman encoding is used, the blocks of the image data are first mirror-transformed about a vertical axis before it is compressed, and then the decoding is modified to effectively transpose the image about a diagonal axis to provide a clockwise rotated image of +270°. It should be appreciated that in order to provide a mirror-transformed image before compression, the image creator is required to know that a counterclockwise-rotated image is to be formed upon decompression before the compression is performed.

Thus, for a counterclockwise rotation, the image is first mirror-transformed about a vertical axis:

| 3 | 2 | 1 |
|---|---|---|
| 6 | 5 | 4 |
| 9 | 8 | 7 |
| 12 | 11 | 10 |

Also, the following steps are followed:
1. ForInBlock=1 to M
    2. For InScan=1 to N
        3. DC=DCVals[InScan]
        4. PTr=ScanPtrs[InScan]
        5. Huffman decode( )
        6. Intra-block Rotate( )
        7. Decompress( )
        8. DCVals[InScan]=DC
        9. ScanPtrs[InScan]=Ptr In this instance, the scanlines are read from top-to-bottom instead of the bottom-to-top process of the clockwise rotation. Thus, instead of N down to 1, InScan ranges from 1 to N for a counterclockwise rotation. That is, step 2 is modified to increase InScan from 1 to N. This effectively transposes the mirror-transformed image about a diagonal axis and thus provides an image rotated by +270°, or counterclockwise rotated image of −90°. In this fashion, intra-block rotated versions of blocks 3, 6, 9 and 12 are formed first and pasted into the appropriate inter-block rotated position in the output image. This is then followed by forming and inter-block pasting the intra-block rotated versions of blocks 2, 5, 8 and 11, and so forth, giving a rotated final version of the image as:

| 3R | 6R | 9R | 12R |
|---|---|---|---|
| 2R | 5R | 8R | 11R |
| 1R | 4R | 7R | 10R |

It should be appreciated that the counterclockwise rotation of data of −90° (or a clockwise rotation of data of +270°) where Huffman encoding is used can alternatively be done by first mirror-transforming about a vertical axis and additionally mirror-transforming about a horizontal axis before compression and then performing the +90° clockwise rotation discussed above.

It should be appreciated that if rotation is not necessary, the additional information can be ignored and that decompression is performed normally. In particular, it should be appreciated that if a counterclockwise-rotated image is to be provided by rotating the decompressed image after the image is decompressed normally, the counterclockwise rotation process described above is not required and storing the additional information can be avoided.

For an 8½×11 page, this invention requires a significantly smaller sized buffer to store the pointers and coefficients than that needed for an uncompressed rotation buffer. Thus, using the method and apparatus of this invention, the rotated image has excellent quality without requiring a full buffer's worth of memory.

As shown in FIG. 1, the encoder 400 may be implemented on a programmed general purpose computer. However, the encoder 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing steps S1400–S1500 of FIGS. 5 and 6 can be used to implement the encoder 400.

As shown in FIG. 1, the decoder 500 is preferably implemented on a programmed general purpose computer. However, the decoder 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, as set forth above, both of the encoder 400 and decoder 500 can be implemented in a single general purpose computer, a single special purpose computer, a single programmed microprocessor or microcontroller and peripheral integrated circuit elements, a single ASIC or other integrated circuit, a single digital signal processor, a single hardwired electronic or logic circuit such as a discrete element circuit, a single programmable logic device such a PLD, PLA, FPGA or PAL, or the like.

As shown in FIGS. 3 and 4, the additional information register 433 and 533, and the scanline pointer buffers 435 and 535 and the DC coefficient buffers 437 and 537 can be implemented using any known or later developed memory devices and structures including RAM, video RAM, flash memory, cache memory, registers, buffer memory, a hard disk and drive, a floppy disk and drive, an optical disk and drive, a magneto-optical disk and drive, and the like. That is, the operation and structure of the memory device is not critical to the operation of the system and method of this invention.

This invention has been described in connection with the preferred embodiments. However it should be understood that there is no intent to limit the invention to the embodi-

What is claimed is:

1. A method for processing an image represented by digital data, comprising:
   inputting compressed image data, the compressed digital data comprising a plurality of compressed units;
   inputting additional information about a number of the plurality of compressed units, the additional information being input separately from the compressed image data;
   decompressing the compressed units based on the input additional information; and
   combining the decompressed units to form a rotated image.

2. The method of claim 1, wherein the compressed digital data comprises a plurality of blocks forming the plurality of compressed units.

3. The method of claim 2, wherein the plurality of blocks comprises JPEG compressed blocks.

4. The method of claim 3, wherein the additional information about the number of the plurality of compressed units comprises DC coefficients of selected ones of the JPEG compressed blocks.

5. The method of claim 2, further comprising intra-block rotating the compressed blocks before decompressing the compressed blocks.

6. The method of claim 5, wherein decompressing the rotated blocks comprises decompressing, for each intra-block rotated block, that block based on the additional information.

7. The method of claim 1, wherein:
   the digital data comprises a plurality of scanlines;
   the compressed digital data comprises run-length encoded scanlines forming the plurality of compressed units; and
   the additional information comprises a starting point of each run-length encoded scanline in the compressed digital data.

8. The method of claim 7, wherein decompressing the run-length encoded scanlines comprises decompressing, for each scanline, that run-length encoded scanline based on the starting point for that scanline.

9. The method of claim 1, wherein:
   inputting the compressed image data comprises inputting encoded compressed units forming encoded image data; and
   inputting additional information further comprises inputting further additional information about a second number of the encoded compressed units;
   the method further comprising decoding the encoded compressed units based on the further additional information to provide decoded compressed image data as the plurality of compressed units.

10. The method of claim 9, wherein the encoded compressed units comprise variable length encoded compressed units, the further additional information about the second number of the encoded compressed units comprising a starting point in the encoded image data of selected ones of the variable-length encoded compressed units.

11. The method of claim 10, wherein the variable length encoding comprises Huffman encoding.

12. The method of claim 10, wherein decompressing the encoded compressed units comprises decompressing, for each unit, that variable length encoded compressed unit based on the starting point of one of the selected ones of the variable-length encoded compressed units.

13. An apparatus for processing an image represented by digital data, comprising:
    a memory that stores compressed image data, the compressed digital data comprising a plurality of compressed units;
    a memory that stores additional information about a number of the plurality of compressed units, the additional information being stored separately from the compressed image data;
    a decompressor that decompresses the compressed units based on the stored additional information; and
    a combiner that combines the decompressed units to form a rotated image.

14. The apparatus of claim 13, wherein the compressed digital data comprises a plurality of blocks forming the plurality of compressed units.

15. The apparatus of claim 14, wherein the plurality of blocks comprises JPEG compressed blocks.

16. The apparatus of claim 15, wherein the additional information about the number of the plurality of compressed units comprises DC coefficients of selected ones of the JPEG compressed blocks.

17. The apparatus of claim 14, further comprising an intra-block rotator that rotates the compressed blocks before the decompressor decompresses the compressed blocks.

18. The apparatus of claim 17, wherein the decompressor decompresses, for each intra-block rotated block, that block based on the additional information.

19. The apparatus of claim 13, wherein:
    the digital data comprises a plurality of scanlines;
    the compressed digital data comprises run-length encoded scanlines forming the plurality of compressed units; and
    the additional information comprises a starting point of each run-length encoded scanline in the compressed digital data.

20. The apparatus of claim 19, wherein the decompressor decompresses, for each scanline, that run-length encoded scanline based on the starting point for that scanline.

21. The apparatus of claim 13, wherein:
    the compressed image data memory stores encoded compressed units forming encoded image data;
    the additional information memory stores further additional information about a second number of the encoded compressed units; and
    the decompressor provides decoded compressed image data as the plurality of compressed units by decoding the encoded compressed units based on the further additional information.

22. The apparatus of claim 21, wherein the encoded compressed digital data comprises variable length encoded compressed units, the further additional information about the second number of the encoded compressed units comprising a starting point in the encoded image data of selected ones of the variable-length encoded compressed units.

23. The apparatus of claim 22, wherein the variable length encoding comprises Huffman encoding.

24. The apparatus of claim 22, wherein the decompressor decompresses, for each unit, that variable length encoded compressed unit based on the starting point for one of the selected ones of the variable-length encoded compressed units.

* * * * *